No. 888,051. PATENTED MAY 19, 1908.
O. THOMAS & G. BLACKWELL.
LOCK NUT.
APPLICATION FILED OCT. 26, 1906.
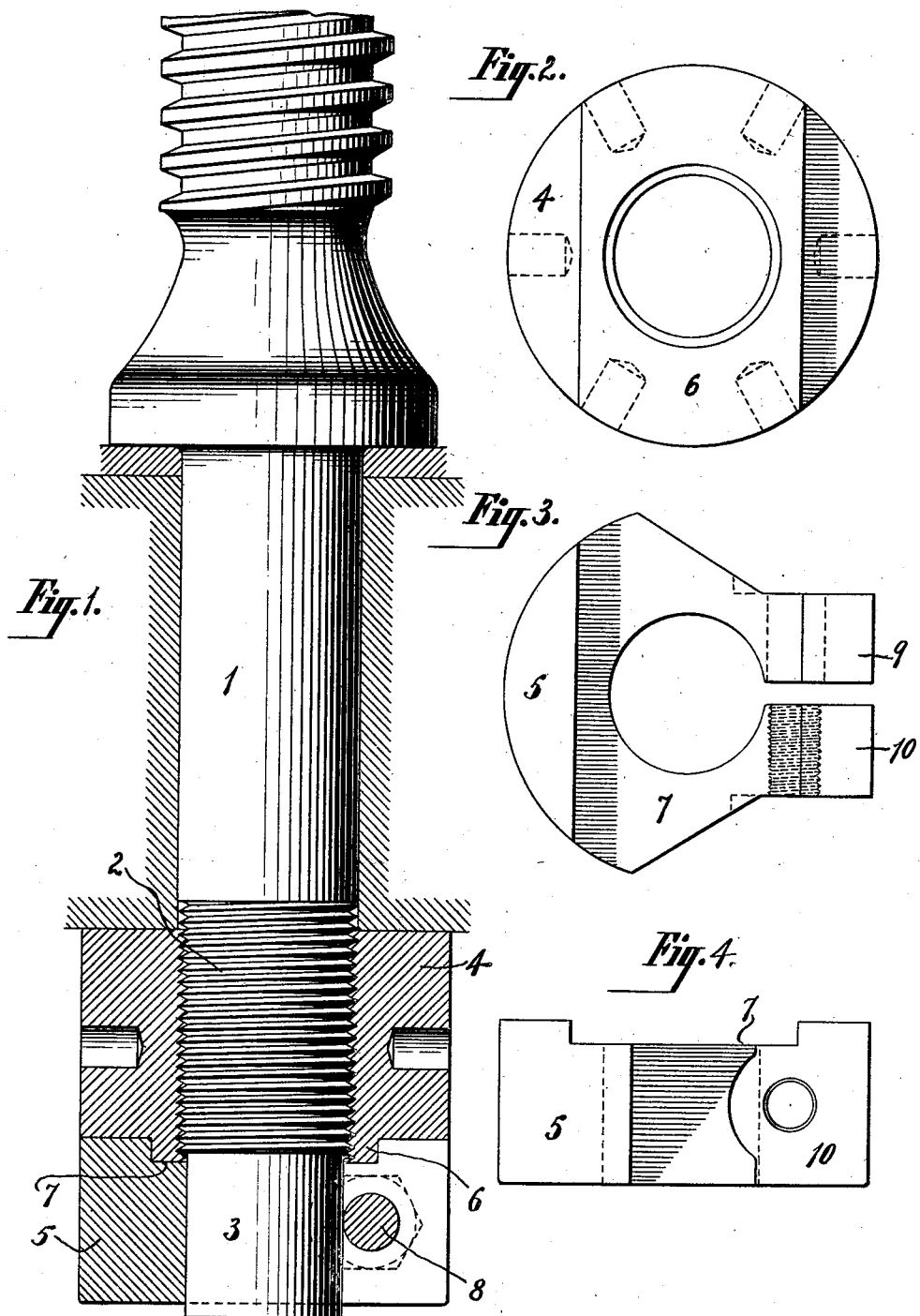

UNITED STATES PATENT OFFICE.

OMER THOMAS, OF BEDFORD, AND GRANT BLACKWELL, OF GUTHRIE, INDIANA, ASSIGNORS TO INGERSOLL-RAND COMPANY, OF NEW YORK, N. Y., A CORPORATION OF NEW JERSEY.

LOCK-NUT.

No. 888,051.	Specification of Letters Patent.	Patented May 19, 1908.

Application filed October 26, 1906. Serial No. 340,727.

*To all whom it may concern:*

Be it known that we, OMER THOMAS and GRANT BLACKWELL, citizens of the United States, the former a resident of Bedford, in the county of Lawrence and State of Indiana, and the latter a resident of Guthrie, in the county of Lawrence and State of Indiana, have invented a new and useful Improvement in Lock-Nuts, of which the following is a specification.

Our present invention relates to an improvement in lock nuts and has more particularly for its object to provide a very simple and effective device for absolutely locking a nut against movement on its thread when once adjusted to the desired point.

The present invention is shown as applied to the feed screw of a track channeler.

A practical embodiment of the invention is represented in the accompanying drawings in which Figure 1 represents the lower portion of the feed screw of a track channeler with the feed screw nut and split jam nut in position thereon, the two nuts being shown in section, Fig. 2 is an end view of the feed screw nut, Fig. 3 is an end view of the split jam nut, Fig. 4 is a side view of the split jam nut.

The feed screw is denoted by 1 and it has a threaded portion 2 and a plain portion 3 at its lower end. The feed screw nut is denoted by 4 and it is arranged to engage the threaded portion 2 of the feed screw. The split jam nut is denoted by 5 and it is arranged to be interlocked with the feed screw nut 4 and also clamped to the plain portion 3 of the feed screw. The interlocking of the two nuts is accomplished in the present instance as follows. The feed screw nut 4 is provided with a lug 6 across its bottom, said lug having parallel sides. The split jam nut 5 is provided with a recess 7 across its top, said recess having parallel sides and being arranged to receive the lug on the bottom of the feed screw nut. A bolt 8 passes laterally through the split ends 9 and 10 of the jam nut for the purpose of clamping the nut to the plain portion 3 of the feed screw. In use the feed screw nut 4 may be adjusted to the desired point on the threaded portion 2 of the feed screw. The split jam nut 5 may then be brought into interlocking engagement with the nut 4 and then clamped to the plain portion 3 of the feed screw, thus locking the feed screw nut securely in position. It will be seen that by this arrangement the nut 4 may be readily adjusted on its thread and then clamped in position.

While we have shown this lock nut in connection with the feed screw of a channeler, it is to be understood that it may be successfully used wherever a lock nut of this character is required.

What we claim is:

1. The combination with a screw having threaded and plain cylindrical portions, of a nut engaging said threaded portion, a split jam nut on the plain cylindrical portion and having a direct interlocking engagement with the nut on the threaded portion and means carried by the split jam nut for clamping it to the said plain cylindrical portion of the screw.

2. The combination with a screw having threaded and plain cylindrical portions, of a nut engaging said threaded portion, a split jam nut and means carried by said split jam nut for clamping it to said plain cylindrical portion of the screw, one of the nuts having a lug on its face and the other nut having a recess in its face arranged to receive said lug for interlocking the nuts.

3. The combination with a screw having threaded and plain cylindrical portions, of a nut engaging said threaded portion, a split jam nut and means carried by the split jam nut for clamping it to said plain cylindrical portion of the screw, one of said nuts having a lug on its face provided with parallel sides and the other nut having a recess in its face provided with parallel sides and arranged to receive said lug for interlocking the nuts.

In testimony that we claim the foregoing as our invention, we have signed our names in presence of two witnesses, this 9th day of Oct. 1906.

OMER THOMAS.
GRANT BLACKWELL.

Witnesses:
ALBERT W. DEIRKING,
CHAS. WM. GOBAT.